(No Model.)
J. BENEDICT.
GATHERING TRAY.
No. 375,596. Patented Dec. 27, 1887.
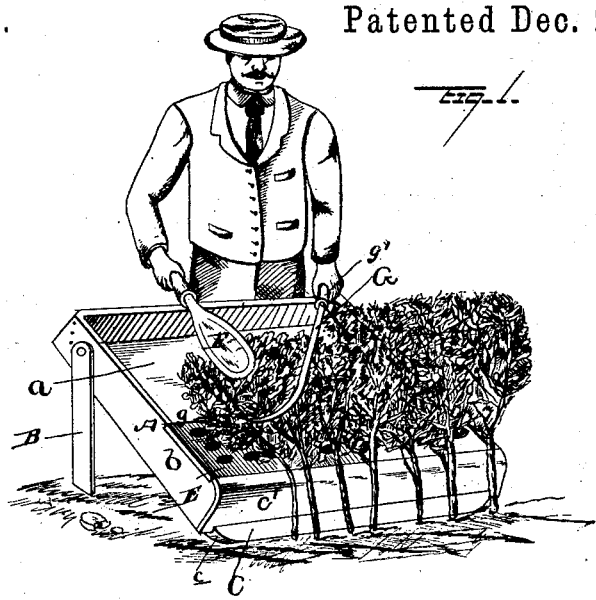
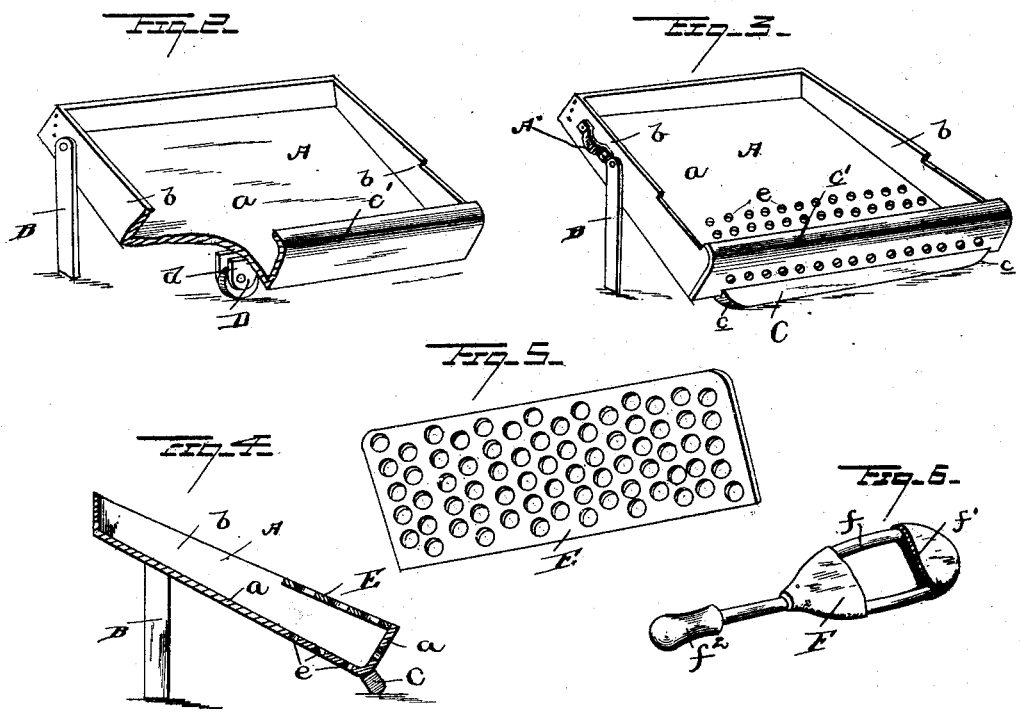
Witnesses
Wm. T. Gill.
E. G. Siggers
Inventor
Jewett Benedict
By his Attorneys
C. A. Snowden

UNITED STATES PATENT OFFICE.

JEWETT BENEDICT, OF DUNDEE, NEW YORK.

GATHERING-TRAY.

SPECIFICATION forming part of Letters Patent No. 375,596, dated December 27, 1887.

Application filed August 11, 1886. Serial No. 210,629. (No model.)

*To all whom it may concern:*

Be it known that I, JEWETT BENEDICT, a citizen of the United States, residing at Dundee, in the county of Yates and State of New York, have invented a new and useful Improvement in Gathering-Trays, of which the following is a specification.

My invention relates to an apparatus for gathering berries; and it consists of the novel construction of devices and parts substantially as hereinafter fully described, and particularly pointed out in the claims.

The object of my invention is to provide an apparatus for quickly gathering raspberries and other like fruit, so that a much larger quantity of fruit can be gathered in the same time than by the old method of picking them by hand, thereby effecting an economy in gathering the fruit, and consequently in evaporating or preserving it.

In the drawings hereto annexed, which illustrate devices embodying my invention, Figure 1 illustrates the method of gathering the berries from a bush. Fig. 2 is a perspective view of a modified form of tray. Fig. 3 is a like view of another form of tray, and Fig. 4 is a vertical sectional view of the tray shown in Fig. 3. Fig. 5 is a detached view of the shield. Fig. 6 is a perspective view of the beating implement, partly in section.

I will first describe the peculiar construction and arrangement of the parts of devices constructed in accordance with my invention, and then the operation incident to the use of said apparatus.

Referring to the drawings, in which like letters of reference denote corresponding parts in all the figures, A designates the gathering tray or receptacle, which comprises a bottom, $a$, having tapering or converging sides, the converging side walls, $b$, extending upward so as to be arranged at an angle to the bottom, and of gradually-decreasing height from front to rear, and a vertical rear wall, $c'$, which joins the side walls, $b$. The general shape or contour of the tray is substantially rectangular. The tray is further provided with an extensible leg or support, B, which is pivoted at one end to the reduced rear end of one of the side walls, $b$, of the tray, so that by swinging the leg downwardly the tray is supported in an elevated position above the ground, and thus relieves the operator of the labor of supporting or holding it while he is engaged in picking the berries. By making the side walls of the tray tapering from rear to front the front end is made considerably larger than the rear end, which is thereby reduced, and by inclining or converging the said side walls toward each other at the rear end of the tray it is caused to form a contracted discharge-mouth, which avoids the liability of spilling and destroying the fruit in pouring it from the tray into a larger receptacle or the evaporating apparatus.

The bottom of the tray or receptacle is provided with a runner, C, that is rigidly affixed thereto by any suitable means, and this runner is located longitudinally of the tray and beneath the enlarged front end of the same. The ends of the runner are beveled or inclined at $c$, and this runner rests on the ground and glides over the same when the tray is pushed or otherwise forced along from bush to bush by the operator or attendant, the beveled or inclined ends $c$ thereof riding over the uneven surface or other obstructions in its path, so as to facilitate the movement of the tray. The bottom of the tray is thus elevated out of contact with the ground to prevent wear and friction thereof, and the tray can be easily and rapidly moved and adjusted. The rear contracted end of the tray is closed by a short vertical wall, to prevent the berries or other fruit from rolling out of the tray accidentally; and when the tray is in transit from one bush or point to another the pivoted leg B thereof is folded alongside of the wall of the tray to which it is pivoted, so as to be out of the way and not hinder the tray.

In lieu of providing the tray with the runner C, it may have the bearing wheels or rollers D, that are loosely journaled on suitable shafts or pins carried by suitable brackets, $d$, which are affixed to the tray in any preferred manner. The bearing rollers or wheels D are arranged in the line of travel or motion of the tray, so as to elevate the bottom thereof out of contact with the ground, and they are disposed on the bottom of the tray at the enlarged end thereof. I prefer, however, to employ the runner C, as it is not liable to become clogged, as the rollers or wheels D are, and it is much cheaper and more readily replaced, and at a trifling sum, when it is worn out, than the rollers.

The bottom of the tray at the enlarged front end thereof may be provided with two or more series of transverse openings or perforations, e, as shown in Fig. 3, which permit of the free and ready escape of sand and other material, which adhere to the bushes and berries when it rains. It is well known that the bushes and fruit very often have accummulations of sand and dirt immediately after a rain, especially if it be a very hard or protracted one, and when such is the case the tray, with the transverse openings in its bottom, (shown in Fig. 3,) is employed, so that the dirt and sand which fall therein from the bushes or along with the fruit can escape very readily.

The tray is sometimes provided with suitable handles, A', on its sides, as shown in Fig. 3, by means of which it can be readily grasped and carried by the operator.

The tray can be constructed entirely of sheet metal or wood, or it can be made of a wooden skeleton frame covered with canvas or other pliable textile fabric or material, so as to cushion the berries in their descent and obviate bruising or damaging the same, and I would therefore have it understood that I do not confine myself to any particular material from which the tray can be made.

E designates a shield, which is provided with a series of transverse openings of a size sufficiently large to permit of the free passage of the berries or fruit therethrough, and this shield is arranged across and above the bottom of the tray, so as to be out of contact therewith. The function of this shield is to exclude the leaves of the bush from passing into the tray along with the berries, and the shield is removably fitted on the tray in any suitable manner, so that it can be readily detached to empty the tray of its contents, after which it is replaced.

F designates the beating implement, which is to be operated or wielded by hand to strike the bush with sufficient force to cause the ripe berries to drop therefrom.

The implement is padded in order to cushion the strokes thereof and prevent damage to the bush and its fruit; and the implement preferably consists of an open loop or frame, $f$, a pad of pliable or textile material or fabric, $f'$, which is stretched tightly across the frame and secured thereto very securely, and a suitable handle, $f^2$, which is rigidly secured to the frame and is to be grasped by the hand of the operator in order to manipulate the implement properly.

G designates a drawing-rod, which is provided at one end with a hook, $g$, and at its opposite end with a handle, $g'$. The handle is grasped by the operator, who uses the device in properly drawing or adjusting the bush with its fruit over the tray preparatory to beating the bush with the beating implement F.

The operation of gathering berries according to my invention is as follows: The tray is placed beneath the bush, and the latter is then drawn or adjusted over the tray, and the beating implement is then used to strike the bush and cause its ripe berries to be shaken off by the shock and drop into the tray. The leg may be unfolded to support one side of the tray, and the other side is supported by the operator, or the tray may rest on the ground. The strokes of padded bat or beating implement will cause no injury to the bush and its fruit.

During the course of practical experiments in gathering berries according to my process or method and with devices of my invention I have found that the fruit can be gathered very much more rapidly by a smaller number of operators and within a shorter space of time than by the old method of picking them by hand, thus effecting a very great economy in the cost of gathering the fruit.

Having thus fully described my invention, what I claim as new, and desire to secure by Letters Patent, is—

1. The herein-described pan or tray for use in gathering fruit, said pan or tray comprising the bottom $a$, the side walls, $b$, extending upward and inward toward each other and of gradually-increasing height, the highest portion being at the lower end of the tray, where it rests on the ground, whereby the capacity of the pan is greater at the lower end thereof, and a detachable perforated shield, E, supported upon the side walls above and out of contact with the bottom of the pan or tray, said shield extending over the lower portion of the tray, so as to leave the upper portion open for the entrance of the fruit into the pan, as set forth.

2. The herein-described pan or tray for use in gathering fruit, said pan or tray comprising the bottom $a$, having perforations $e$, the side walls, $b$, extending upward and inward toward each other and of gradually-increasing height, the highest portion being at the lower end of the tray, where it rests on the ground, whereby the capacity of the pan is greater at the lower end thereof, and a detachable perforated shield, E, supported on the side walls above and out of contact with the bottom of the pan or tray, said shield extending over the lower portion of the tray, so as to leave the upper portion open for the entrance of the fruit into the pan, and the perforations $e$ in the bottom of the pan being underneath the shield E, whereby the latter forms an inclosed space at the lower portion of the pan where the fruit collects, as set forth.

3. A gathering-pan which when in use is adapted to be supported in an inclined position with one end resting on the ground, said pan being provided with a runner depending from the bottom at the end which rests on the ground, said bottom being perforated at this same end, and a detachable perforated shield supported above the bottom on a line parallel with the perforated portion, but above and out of contact therewith, said shield extending but partly up the tray, so as to leave the upper end thereof open, as set forth.

In testimony that I claim the foregoing as my own I have hereto affixed my signature in presence of two witnesses.

JEWETT BENEDICT.

Witnesses:
   H. V. L. JONES,
   W. BENEDICT.